Figure 1:
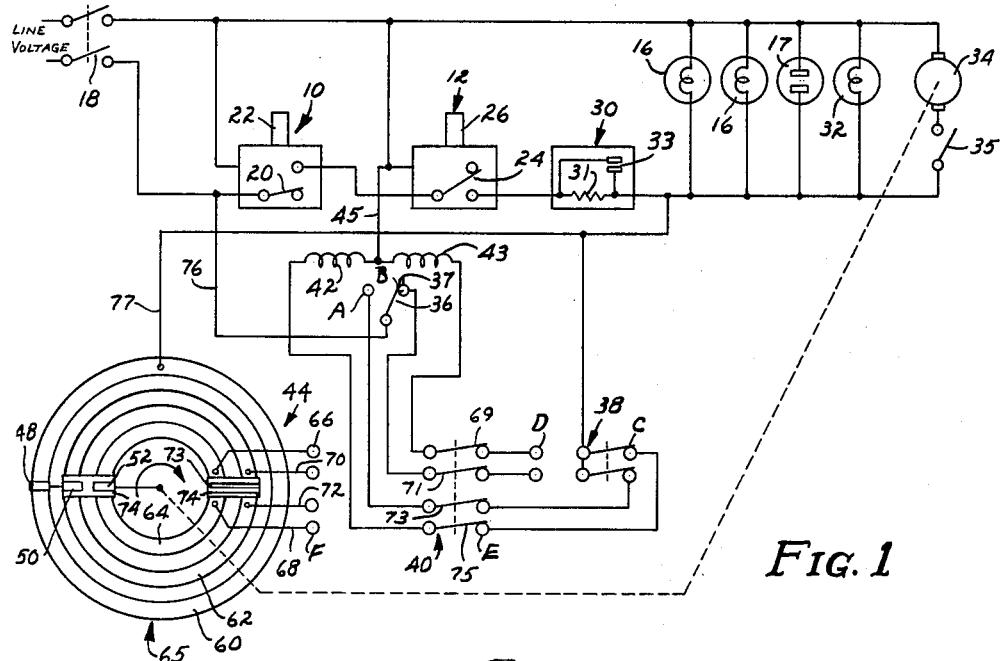

March 26, 1963      E. ISAKSEN      3,083,300

YARDLIGHT CONTROL SYSTEM

Filed Nov. 8, 1961

INVENTOR.
ELMER ISAKSEN
BY William F. Woods
ATTORNEY

United States Patent Office
3,083,300
Patented Mar. 26, 1963

1

3,083,300
YARDLIGHT CONTROL SYSTEM
Elmer Isaksen, Rte. 1, Cushing, Minn.
Filed Nov. 8, 1961, Ser. No. 151,012
1 Claim. (Cl. 250—209)

This invention relates to an electrical control system; in particular, it concerns a novel electrical control system that is responsive to the light projected from the headlights of a vehicle for automatically switching lights, energizing alarm systems, electrical appliances and other electrically operated devices in a novel manner without the need for personal attention during the sequence of operation and at the same time permitting manual or semi-automatic control.

Various automatic driveway light operators have been devised which have for their main purpose the illumination of driveways as one drives up to the garage. In many of these devices the operation is automatic; that is, they turn on the lights for a few minutes and at the end of a short interval the lights are turned off automatically. One of the main disadvantages of these prior art systems for automatically controlling the operation of yardlights is that they are often equipped with a large number of expensive and rather sophisticated components. For example, some of them employ electronic tubes and extremely intricate circuitry to accomplish their results. Other systems use simpler components but suffer from their inability to perform according to the specific needs of the average user of the system. Another disadvantage frequently found in many prior art yardlight or driveway control systems is that the electrical load connected to the switching system is limited in its capacity by the maximum capacity or power rating of the photo-electric light sensitive units that energize the system upon the approach of a light source. A requirement for such a system is that the entire unit be adapted for automatic, semi-automatic or manual control without going through complicated and time consuming procedures to select a particular mode of operation and the system must be dependable at all times.

Accordingly, it is an object of this invention to provide a yardlight control system that will overcome the disadvantages and meet the requirements listed above.

Another important object of this invention is to provide novel and improved means for controlling yardlights and other electrical devices.

Another object of this invention is to provide in a yardlight control system novel and improved means for energizing electrical devices in response to the approach of an automobile headlight beam with the load carrying capacity of the electrical devices being unaffected by the electrical load carrying capacity of the light-sensitive elements used in the system.

Yet another object of this invention is to provide an automatic yardlight control system that is reliable in operation, economical to manufacture, extremely rugged, and capable of operating with a minimum of power.

A further object of this invention is to provide an electrical control system for yardlights and similar devices that can be selectively operated either automatically, semi-automatically or manually.

Another object of this invention is to provide a novel timing switch for operation of an electrical control system.

A further object of this invention is to provide in an automatic yardlight control, novel circuitry adapted to energize selected components upon the approach of a light source.

A still further object of this invention is to provide a novel electric control system for remotely switching yardlights and similar devices for a selected time interval during the hours of darkness and having means for automatically disabling the system during the daylight hours.

Another object of this invention is to provide in an automatic remotely controlled yardlight control system novel and improved circuitry for accomplishing the results desired with a minimum of attention and trouble.

These and other objects and advantages of the invention will become apparent from a consideration of the following detailed specification and accompanying drawing wherein a preferred embodiment of the invention is shown by way of illustration and not by way of limitation.

Figure 2:
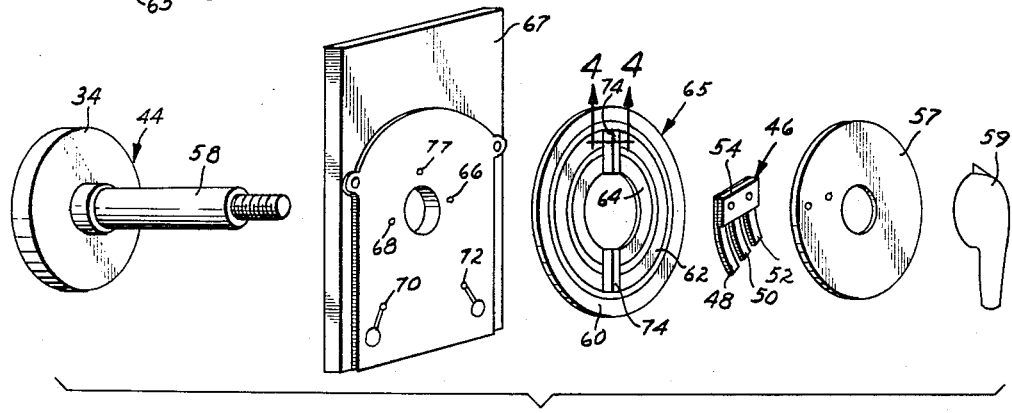

In the drawing:
FIGURE 1 is a circuit diagram showing the components making up the invention;
FIGURE 2 is an exploded perspective view of the time switch employed in the invention; and
FIGURE 3 is an elevational view of the photo-electric means used to initiate the sequence of operations performed by the components shown in FIGURES 1 and 2; and
FIGURE 4 is a fragmentary enlarged sectional view taken on the line 4—4 of FIGURE 3.

My yardlight control system may be used to operate yardlights or other electrical devices by means of a conventional on-off switch or it may be used to turn on yardlights etc. by remotely utilizing the light source from the headlights of an automobile or other vehicle. The term "yardlight" herein indicates any electrical device that is actuated by the circuitry disclosed and is not limited specifically to yardlights per se.

Figure 3:
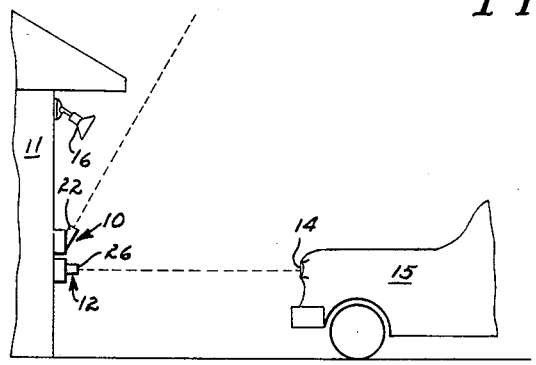
Figure 4:
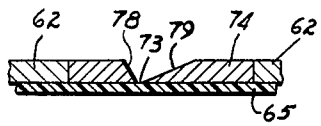

Referring to FIGURES 1 and 3, reference character 12 indicates a photo-unit that is used to turn on the yardlights remotely and reference character 10 indicates a second photo-unit that renders the remote control section of the system inoperative during the daylight hours. As shown in FIGURE 3, photo-unit 12 is located on garage 11 so as to aim at the approaching headlights 14 of a vehicle 15, while photo-unit 10 is aimed towards the sky. Reference numeral 16 indicates generally the yardlights used in the operation of the system. In considering the circuit diagram of FIGURE 1, it should be noted that one "side" of all active components contained in the system are connected to one "side" of the line (through the main switch), while the other "side" of the line is connected to the yard lights 16 via two separate paths. One of these paths to yardlights 16 is through photo-units 10, 12 and a time delay relay and the other is through a solenoid operated microswitch, timer on-off switch, and either through a manual on-off switch or a time switch, as will be explained.

My control system features three operating modes, which include (1) remote with manual shut-off, (2) remote with automatic shut-off, and (3) manual operation. This description will begin with a discussion of the remote with manual shut-off operation of the system.

When the main power switch 18 is closed, line voltage is connected to photo-unit 10. The active contacts of switch 20 of photo-unit 10 remain open as long as light falls upon photo-cell 22 (daylight hours). At darkness, active switch contacts 20 close and line voltage is supplied to photo-unit 12 from photo-unit 10. The contacts of switch 24 of photo-unit 12 remain open until light from the headlamps of an approaching vehicle falls upon photo-cell 26. When light falls upon photo-cell 26, switch contacts 24 close and line voltage is supplied to the series-connected circuit consisting of the time delay relay 30 and the following parallel-connected circuit elements: yardlights 16, plug-in outlet 17, the "yardlight on" pilot lamp 32, and the time clock motor 34 (providing clock switch 35 is set at on). For purposes of convenience, these parallel circuits will hereinafter be referred to as the "yardlight circuit."

Current flowing through the yardlight circuit also flows through heating element 31 of the time delay relay 30. The resistance of heating element 31 is greater than the resistance of the solenoid control circuit (as hereinafter described) and therefore most of the line voltage is distributed across the heating element 31 and the yardlights remain off. After the current flows through the heating element 31 for approximately 1½ seconds, contacts 33 of time delay relay 31 close. The closing of contacts 33 enables full line voltage to be supplied to the control circuit. The purpose of time delay relay 30 is to prevent remote operation of the system due to lightning flashes falling upon photo-cell 26. Thus after an initial period of about 1½ seconds (enough time to allow for a temporary flash of lightning) full line voltage is supplied to the control circuit and then to the yardlight circuit as long as light falls upon photo-cell 26.

Before the light supplied to photo-cell 26 is interrupted, a solenoid-operated microswitch 36 having positions A and B, is energized. The function of the solenoid-operated micro-switch 36 is to provide a source of line voltage to the yardlight circuit after line voltage supplied from photo-unit 12 is interrupted. The circuit further includes a manual double-pole, double throw on-off switch 38, having two positions C and D, and a four-pole, double-throw timer on-off switch 40 having E and F positions. The C position of switch 38 is connected to solenoid 42 and the D position of switch 38 is connected to solenoid 43. Solenoids 42 and 43 have a common connection 45 to one side of the line. If the manual on-off switch 38 is set at position C, and if the timer on-off switch 40 is set at its position E, line voltage energizes solenoid 42. When solenoid 42 is energized, it drives the pole 37 of micro-switch 36 to its A position and line voltage is then supplied directly to the yardlight circuit via the pole 37 and the A contact of microswitch 36, position E contacts and poles of timer on-off switch 40, and through the poles and position C contacts of manual on-off switch 38. Full line voltage is supplied to the yardlight circuit until the manual on-off switch 38 is set at position D. When manual on-off switch 38 is at position D, the line voltage to the yardlight circuit is interrupted. If light from an approaching vehicle falls upon photo-cell 26 after switch 38 is set to its D position, solenoid 43 is energized. When solenoid 43 is energized, it drives the pole 37 of micro-switch 36 to its position B contacts and line voltage is supplied directly to the yardlight circuit via pole 37 and position B contacts of microswitch 36, through the poles and position E contacts of timer on-off switch 38. To turn the yardlight 16 off, the manual on-off switch 38 must now be set at position C.

A time switch 44 provides remote operation of the system with automatic shut-off. In this instance, line voltage is supplied to the yardlight circuit through time switch 44 and the position F contacts and poles of timer on-off switch 40. When remote operation with automatic shut-off is desired, clock switch 35 is closed and switch 40 is set at its position F contacts. This disconnects manual on-off switch 38 from the control circuit. When light falls upon photo-cell 26, line voltage is supplied to the yardlight circuit as described above. Time clock motor 34 rotates wiper element 46 having three short circular shaped contact strips 48, 50 and 52 that are concentrically carried by a base 54 driven by motor shaft 58. (See FIGURE 2.) Electrical contact is made between rotating contact strips 48, 50, 52 and the corresponding conductive radially spaced annular rings 60, 62 and 64 of fixed contact plate 65. Leads 66, 68, 70 and 72 of time switch 40 are connected to the poles 69, 71, 73, and 75 on the F side of switch 40 as shown in FIGURE 1. A lead 77 connects the outer ring 60 of contact plate 65 with one side of the yardlight circuit. The outer ring 60 of contact plate 65 constitutes a continuous conductor, while the inner rings 62 and 64 are divided into semi-circular conducting segments by virtue of a radially split conductor 74 disposed on each side of contact plate 65 along a common diameter. Contact plate 65 is mounted upon a suitable base member 67 adapted to support motor 34 and shaft 58 of time switch 44. As shown in FIGURE 4, conductor 74 separates the opposed semi-circular segments 62, 64 by virture of a radial gap 73, located between a sharply defined shoulder 78 and contact portion 79 inclined upwardly from shoulder 78 resulting in a positive transfer of contacts 50, 52 of wiper element 46 from one side to the other. A cover plate 57 and re-set knob 59 are further provided for time switch 44.

When line voltage is supplied to the yardlight circuit under the conditions above described, current flows to the outer ring 60 of time switch 44. Contact strips 48, 50 and 52 of wiper 46 are initially positioned upon conductor 74 either as shown in FIGURE 1 or 180° removed therefrom. As soon as wiper element 46 begins to rotate, contact strips 48, 50 and 52 leave the one side of conductor 74 and the outer ring 60 and the two inner rings 62, 64 are electrically connected. For the initial position of wiper element 46 (as shown in FIGURE 1 except with contact strips 48, 50, 52 engaging the edges of inner rings 62 and 64), voltage is supplied from lead 77 to outer ring 60, inner ring 64, lead 66 of time switch 44 through an F position contact and pole 69 of switch 40 to solenoid 43. When solenoid 43 is energized, it drives the pole 37 of microswitch 36 to its B position. When microswitch 36 is at position B and contact strips 48, 50 and 52 are slightly clockwise of their initial position, as shown in FIGURE 1, line voltage is supplied directly to the yardlight circuit through lead 76, pole 37 and B contact of microswitch 36, pole 71 and a position F contact of switch 40 and lead 77. This condition exists until wiper element 46 rotates approximately 180° from its initial position. When wiper element 46 is rotated about 180°, contact strips 48, 50 and 52 engage the other side of conductor 74, as explained, and the line voltage is interrupted, thus disabling the yardlight circuit. If light from an approaching vehicle falls upon photo-cell 26 after the yardlight circuit is automatically disabled, solenoid 42 is energized by voltage supplied through lead 77, outer ring 60, inner ring 64, lead 68, and an F contact and pole 75 of switch 40. This causes pole 37 of microswitch 36 to move to its A position and line voltage is supplied directly to the yardlight circuit through the path defined by pole 37 and an A contact of microswitch 36, pole 73 and a position F contact of switch 40, through lead 72, inner ring 62, outer ring 60 and lead 77. Thus either one set of the circular rings 62, 64 or the other carries the current according to the position of the wiper element 46 and switch 40.

Manual operation of the system is accomplished through use of the manual on-off switch 38. In this case, switch 40 must be set at its position E. When manual on-off switch 38 is set at its C position, the yardlight circuit is disabled. Setting manual on-off switch 38 to its D position allows current to flow to the yardlight circuit from pole 37 and D contact side of microswitch 36, through the poles and position E contacts of switch 40, and through the position D contacts and poles of manual on-off switch 38. In addition, for the manual operating mode, clock switch 35 must be set at the off position otherwise the initial starting position of wiper element 46 will not be from the gap 73 of conductor 74 separating the two halves of rings 62, 64 on time switch 44.

It can be seen that when time switch 44 is used for remote operation with automatic shut-off, the time interval for the on cycle is determined by the length of the middle and inner contact rings 62 and 64. By adjusting their length and providing additional split conductors 74 it is possible to select whatever time interval is desired for the operation of the system. For example, the assembly shown in the drawing may be so constructed and arranged that shaft 58 of time switch 44 revolves at the rate of one revolution per hour. By dividing middle and inner rings 62, 64 into two generally semi-circular segments (as shown), the time elapsed during the contact of wiper element 46 with each segment of rings 62, 64 is about thirty minutes. Similarly, to provide an interval of about fifteen minutes, rings 62, 64 may be divided into quarter segments and two additional conductors 74 provided. The length of rings 62 and 64 may be thus pre-selected to yield a time interval appropriate to any situation.

Thus there has been shown and described a new and improved circuit for controlling yardlights, alarm systems, electrical outlets and other devices dependent upon electrical energy for their operation. It can be seen that the circuits in photo-units 10 and 12 carry no current when the yardlight circuit is off thus saving considerable power during periods of non-use. Furthermore, when the yardlight circuit is energized, the voltage supplied to the photo-unit circuit is shunted immediately through solenoids 42, 43 and the other elements in the solenoid actuated part of the system including switches 38, 40 and timer 44 to the yardlight circuit. The result obtained by this feature is that the load capacity of the yardlight circuit is independent of the current rating of the contacts in the photo-units 10, 12 and the time delay relay 30.

My invention has been sufficiently tested and found to be entirely satisfactory. It will be obvious to those skilled in the art that the invention may be modified by many substitutions and equivalents and that this disclosure is intended to be illustrative only. Therefore, I intend to be limited solely by the scope of the appended claim.

I claim:

A yardlight control system including a source of line voltage, a first photo-electric switch adapted to close its contacts upon the occurrence of darkness, a second photo-electric switch in series with said first photo-electric switch and adapted to close its contacts upon receiving illumination from an automobile headlight, means for momentarily interrupting the flow of current from said second photo-electric switch whenever stray instantaneous light sources hit said second photo-electric switch, a yardlight circuit, a control circuit for operating said yardlight circuit independently of said photo-electric switches, said control circuit including a solenoid actuated two position micro-switch adapted to supply current to said yardlight circuit when said micro-switch is in either of one of its two positions, means in said control circuit for manually enabling the solenoids actuating said micro-switch, means in said control circuit for automatically enabling the solenoids in said micro-switch, said automatic solenoid enabling means including a time switch having a fixed circular contact plate having at least three radially spaced concentric conductor rings, a plurality of movable wipers engageable with the conductor rings of said contact plate, at least two of said conductor rings being divided according to the time interval desired for a particular sequence of operation of said yardlight circuit, means connecting said time switch to the solenoids operating said micro-switch and to said micro-switch and said yardlight circuit, and switch means in said control circuit for selecting either manual or automatic disabling of said yardlight circuit or complete manual on-off operation of said yardlight circuit.

References Cited in the file of this patent
UNITED STATES PATENTS

| | | |
|---|---|---|
| 2,095,688 | Ballentine | Oct. 12, 1937 |
| 2,217,064 | Mackenzie | Oct. 8, 1940 |
| 2,220,427 | Romanus | Nov. 5, 1940 |
| 2,450,021 | Schirmer et al. | Sept. 28, 1948 |
| 2,978,591 | Ringer | Apr. 4, 1961 |